United States Patent
Chaturvedi et al.

(10) Patent No.: US 8,782,182 B2
(45) Date of Patent: Jul. 15, 2014

(54) GENERATING DEVICE-SPECIFIC CONFIGURATIONS

(75) Inventors: Animesh Chaturvedi, Fremont, CA (US); Manan Shah, San Jose, CA (US); Marc Lavine, Sunnyvale, CA (US); Ron Lau, Los Altos Hills, CA (US)

(73) Assignee: Foundry Networks, LLC, San Jose, CA (US)

( * ) Notice: Subject to any disclaimer, the term of this patent is extended or adjusted under 35 U.S.C. 154(b) by 587 days.

(21) Appl. No.: 11/970,460

(22) Filed: Jan. 7, 2008

(65) Prior Publication Data

US 2011/0131398 A1 Jun. 2, 2011

Related U.S. Application Data

(60) Provisional application No. 60/931,736, filed on May 24, 2007.

(51) Int. Cl.
*G06F 15/177* (2006.01)
(52) U.S. Cl.
USPC ............ 709/221; 709/222; 709/223; 370/389
(58) Field of Classification Search
USPC ........................... 709/221, 222, 223; 370/389
See application file for complete search history.

(56) References Cited

U.S. PATENT DOCUMENTS

| | | | |
|---|---|---|---|
| 6,560,633 B1 | 5/2003 | Roberts et al. | |
| 6,636,239 B1 | 10/2003 | Arguie et al. | |
| 6,772,207 B1 | 8/2004 | Dorn et al. | |
| 6,833,850 B1 | 12/2004 | Arquie et al. | |
| 6,836,275 B1 | 12/2004 | Arquie et al. | |
| 6,880,127 B1 | 4/2005 | Arquie | |
| 6,952,208 B1 | 10/2005 | Arquie et al. | |
| 6,961,938 B1 | 11/2005 | Carwile et al. | |
| 6,996,769 B1 * | 2/2006 | Peikes et al. | 715/205 |
| 7,069,291 B2 | 6/2006 | Graves et al. | |
| 7,197,545 B1 | 3/2007 | Davie | |
| 7,219,300 B2 | 5/2007 | Arquie et al. | |
| 7,310,774 B1 | 12/2007 | Arquie et al. | |
| 7,590,648 B2 | 9/2009 | Shankar et al. | |
| 2002/0124245 A1 * | 9/2002 | Maddux et al. | 717/176 |
| 2003/0200301 A1 | 10/2003 | Trzcinko et al. | |
| 2005/0050193 A1 * | 3/2005 | Edwiges et al. | 709/223 |
| 2005/0102452 A1 * | 5/2005 | Williams et al. | 710/62 |
| 2006/0190575 A1 * | 8/2006 | Harvey et al. | 709/222 |
| 2006/0190579 A1 * | 8/2006 | Rachniowski et al. | 709/223 |

OTHER PUBLICATIONS

Paulus, Wolf, "Swing Rendering Engine," Swixmi copyright, 2003; first publication date unknown; downloaded~Jul. 2005.
Adwankar, Sandeep, "NetConf Data Model," Motorola, Inc., Jul. 19, 2004 at http://standards.nortel.com/netconf/docs/older_netmod/draft-adwanka, Downloaded May 25, 2007.

(Continued)

*Primary Examiner* — Glenford Madamba

(57) ABSTRACT

An approach to generating device-specific configurations is described. In one approach, a method of generating a device-specific configuration for a target device is described. The method involves receiving a configuration parameter, and receiving command syntax information. A state description is generated from the configuration parameter, with reference to a configuration library. Device information is retrieved from the target device, and the device-specific configuration is generated with reference to the command syntax information, the device information, the state description, and a command library.

19 Claims, 10 Drawing Sheets

System 500

(56) References Cited

OTHER PUBLICATIONS

Davis, M.C., Wipro Technologies, "Wipro XML-based Management Solution," copyright 2004; publication date unknown.

ArcanaNetworks: Products, "Our Products Extensible, Powerful, Reliable, About our Products" at http://www.arcananet.com/Products, publication date unknown, downloaded May 25, 2007.

ArcanaNetworks: Technology, "Foundation: Built on Standards. Powerful. Adaptable. Scalable. Technology" at http://www.arcananet.com/Technology, Publication date unknown, downloaded May 25, 2007.

Bojanic, Peter, "The Joy of XUL," at http://developer.mozilla.org/en/docs/The_Joy_of_XUL publication date unknown; downloaded May 25, 2007.

MDC, "XUL Tutorial:Introduction" at http://developer.mozilla.org/en/docs/XUL_Tutorial:XUL_Structure, publication date unknown, downloaded May 25, 2007.

Marek Lipovcan, "Languatge and user Interface for Router Configuration," 2006 (Master's Thesis on file with Masaryk University, Brno) publication date unknown.

* cited by examiner

Exemplary Network 200

Network Device 300

System 500

```
<feature name="L2AclConfiguration" isIndependent="true" targetType="DEVICE"                          601
    uiResourceKey="METADATA.L2ACLCONFIG" xsi:noNamespaceSchemaLocation="configLibrary.xsd">

<operation type="Add" />                                                                         602

<operation type="Delete" />                                                                      604

<referent referredBy="L2AclBindingConfiguration"
        link="/L2AclConfiguration/L2AclConfiguration@Name"/>

<configuration name="L2AclConfiguration" uiResourceKey="METADATA.L2ACLCONFIG">                   606
        <sequence>
            <configuration name="Acl" minOccurs="0" maxOccurs="unbounded"                            608
                uiResourceKey="METADATA.L2ACLCONFIG.ACL"
                    helpId="help_l2acl_group_config_acls">

<field name="AclNumber" required="true" idField="true"                               610
                    uiResourceKey="METADATA.L2ACLCONFIG.ACL.NUMBER">
                    <type>
                        <integer minValue="400" maxValue="499" default="400"/>
                    </type>
                </field>

<sequence>
                    <configuration name="Entries" minOccurs="1"                                      615
                        maxOccurs="unbounded"
                        uiResourceKey="METADATA.L2ACLCONFIG.ACL.ENTRIES">

<field name="Action" required="true" idField="true"                          620
                            uiResourceKey="METADATA.L2ACLCONFIG.ACL.ENTRY.ACTION">
                            <type><enums>
                                <enum>Permit</enum>
                                <enum>Deny</enum>
                            </enums></type>
                        </field>

<field name="SrcMacAddress" required="true" idField="true"                   621
                            uiResourceKey="METADATA.L2ACLCONFIG.ACL.ENTRY.SRCMAC">
                            <type> <enums>
                                        <editableEnum>
                                            <type><mac/></type>
                                        </editableEnum>
                                <enum>any</enum>
                            </enums></type>
                        </field>

<field name="SrcAddressMask" required="false"                                622
                            depends="@SrcMacAddress!='any'"
                            uiResourceKey="METADATA.L2ACLCONFIG.ACL.ENTRY.SRCMASK">
                            <type>
                                <mac />
                            </type>
                        </field>

<field name="DestMacAddress" required="true" idField="true"                  623
                            uiResourceKey="METADATA.L2ACLCONFIG.ACL.ENTRY.DESTMAC">
                            <type><enums>
                                        <editableEnum>
                                            <type><mac/></type>
                                        </editableEnum>
                                <enum>any</enum>
                            </enums></type>
                        </field>
```

Configuration Model File 600

FIG. 6A

```xml
<field name="DestAddressMask" required="false"                              624
    depends="'@DestMacAddress!='any'"
    uiResourceKey="METADATA.L2ACLCONFIG.ACL.ENTRY.DESTMASK">
    <type><mac/></type>
</field>

<field name="VLAN" required="true"
    uiResourceKey="METADATA.L2ACLCONFIG.ACL.ENTRY.VLAN">             625
    <type><enums default="any">
        <editableEnum>
            <type><integer minValue="1" maxValue="4090"/></type>
        </editableEnum>
        <enum>any</enum>
    </enums></type>
</field>

<field name="EtherType" required="false"
    uiResourceKey="METADATA.L2ACLCONFIG.ACL.ENTRY.EAP_TYPE">         626
    <type>
        <enums>
            <enum></enum>
            <enum>arp</enum>
            <enum>ipv4-l5</enum>
            <enum>ipv6</enum>
            <enum>aarp</enum>
            <enum>appletalk</enum>
            <enum>ipv4</enum>
            <enum>ipv4-igmp</enum>
            <enum>ipv4-igmp-l5</enum>
            <enum>ipx-8137</enum>
            <enum>ipx-llc</enum>
            <enum>ipx-raw</enum>
            <enum>ipx-snap</enum>
        </enums>
    </type>
</field>

<field name="Logging" required="false"                                     627
    uiResourceKey="METADATA.L2ACLCONFIG.ACL.ENTRY.LOG">
    <type>
        <boolean default="true"/>
    </type>
</field>
                <//configuration>
            </sequence>
        </configuration>
    </sequence>
</configuration>
</feature>
```

Configuration Model File 600 (cont.)

FIG. 6B

```xml
<feature type="L2AclConfiguration" writeToRam="false"
   reloadRequired="false" operation="Add">

<configuration type="L2AclConfiguration" overrideReference="false">
      <field name="Name" value="ACG1" idField="false"
         referenceField="false" overrideReference="false"/>
      <configuration type="Acl" overrideReference="false">
         <field name="AclNumber" value="400" idField="true"
            referenceField="false" overrideReference="false"/>

<configuration type="Entries" overrideReference="false">
            <field name="Action" value="Permit" idField="true"
               referenceField="false" overrideReference="false"/>
            <field name="SrcMacAddress" value="any" idField="true"
               referenceField="false" overrideReference="false"/>
            <field name="SrcAddressMask" value="" idField="false"
               referenceField="false" overrideReference="false"/>
            <field name="DestMacAddress" value="any" idField="true"
               referenceField="false" overrideReference="false"/>
            <field name="DestAddressMask" value="" idField="false"
               referenceField="false" overrideReference="false"/>
            <field name="VLAN" value="any" idField="false"
               referenceField="false" overrideReference="false"/>
            <field name="EtherType" value="" idField="false"
               referenceField="false" overrideReference="false"/>
            <field name="Logging" value="" idField="false"
               referenceField="false" overrideReference="false"/>
         </configuration>

<configuration type="Entries" overrideReference="false">
            <field name="Action" value="Permit" idField="true"
               referenceField="false" overrideReference="false"/>
            <field name="SrcMacAddress" value="aaaa.aaaa.aaaa"
               idField="true" referenceField="false" overrideReference="false"/>
            <field name="SrcAddressMask" value="ffff.ffff.ffff"
               idField="false" referenceField="false" overrideReference="false"/>
            <field name="DestMacAddress" value="any" idField="true"
               referenceField="false" overrideReference="false"/>
            <field name="DestAddressMask" value="" idField="false"
               referenceField="false" overrideReference="false"/>
            <field name="VLAN" value="100" idField="false"
               referenceField="false" overrideReference="false"/>
            <field name="EtherType" value="arp" idField="false"
               referenceField="false" overrideReference="false"/>
            <field name="Logging" value="true" idField="false"
               referenceField="false" overrideReference="false"/>
         </configuration>

</configuration>
   </configuration>
</feature>
```

Annotations: 801 covers the outer L2AclConfiguration/Acl fields; 802 covers the first Entries block with callouts 820 (Action), 821 (SrcMacAddress), 822 (SrcAddressMask), 823 (DestMacAddress), 824 (DestAddressMask), 825 (VLAN), 826 (EtherType), 827 (Logging); 803 covers the second Entries block.

State Description 800

FIG. 8

```xml
<commands xmlns:xsi="http://www.w3.org/2001/XMLSchema-instance" xsi:noNamespaceSchemaLocation="cliModel.xsd">
  <command name="L2Acl"                                                                                915
    link="/L2AclConfiguration/L2AclConfiguration/Acl/Entries">
      <version deviceType="MG8" value=">=2.0.05a" />                                                   916
      <version deviceType="RX" value=">=2.2.00" />
      <version deviceType="JetCore" value=">=8.0.00"/>
      <version deviceType="XMR" value="*" />
      <version deviceType="MLX" value="*" />

<cli text="access-list"/>
      <!-- L2 ACL Global Configuration -->

<param name="L2AclNum" link="../@AclNumber"/>                                                    910

<param name="Action">                                                                            920
        <cli link="@Action='Permit'" text="permit"/>
        <cli link="@Action='Deny'" text="deny"/>
      </param>

<param name="src-mac" link="@SrcMacAddress"/>                                                    921

<param name="src-mask" link="@SrcAddressMask"                                                    922
        valueOf="@SrcMacAddress!='any'"/>

<param name="dest-mac" link="@DestMacAddress"/>                                                  923

<param name="dest-mask" link="@DestAddressMask"                                                  924
        valueOf="@DestMacAddress!='any'"/>

<param name="vlan" link="@VLAN!=''" />                                                           925

<param name="ether-type" link="@EtherType!=''">                                                  926
        <cli text="etype" />
      </param>

<param name="logging">                                                                           927
        <cli link="@Logging='true'" text="log-enable">
            <version deviceType="MG8" value=">=2.0.05a" />
            <version deviceType="RX" value=">=2.2.00" />
            <version deviceType="JetCore" value=">=8.0.00"/>
        </cli>
        <cli link="@Logging='true'" text="log">
            <version deviceType="XMR" value="*" />
            <version deviceType="MLX" value="*" />
        </cli>
      </param>

</command>
</commands>
```

Command Model File 900

FIG. 9

GENERATING DEVICE-SPECIFIC CONFIGURATIONS

This application claims the benefit under 35 U.S.C. §119 (e) of U.S. Provisional Application Ser. No. 60/931,736, filed on May 24, 2007, to Chaturvedi et al., entitled "GENERATING DEVICE-SPECIFIC CONFIGURATIONS" which is incorporated herein in its entirety.

BACKGROUND

One of the problems that confront network and computer administrators is how to efficiently configure new features or revise existing configurations of features. In most cases, and particularly when dealing with revisions to the configuration of existing features or enabling new features, configuring devices involves laboriously hand-coding device configurations.

This problem is exacerbated when multiple devices need to be configured. It is not uncommon in modern networks for different models or brands of devices to coexist, or to have different versions of software executing on identical models. Unfortunately, it is not uncommon for different device models (or even the same model with different versions of its software) to require differences in the commands used to configure the same or equivalent functionality.

Device vendors face similar issues in developing and updating management applications. Such applications, used to configure new features available with newer models or newer software, to add management support for new products, and to provide support for existing and legacy devices, need to be constantly updated and modified to remain useful. Often, new features or new types of devices require major changes to the application, if not an entirely new application, to handle differences in the commands used to configure the devices.

SUMMARY

An approach to generating device-specific configurations is described. In one approach, a method of generating a device-specific configuration for a target device is described. The method involves receiving a configuration parameter, and receiving command syntax information. A state description is generated from the configuration parameter, with reference to a configuration library. Device information is retrieved from the target device, and the device-specific configuration is generated with reference to the command syntax information, the device information, the state description, and a command library.

Another approach is described, involving a system for generating a device-specific configuration. The system includes a configuration service, for obtaining and processing configuration information. The system also includes a state model transformer, for producing a state description, and a deployment engine, with a command generator, for generating a device-specific configuration. The configuration service is configured to receive the configuration information. The state model transformer is configured to produce the state description from the configuration information and a configuration parameter, and the deployment engine is configured to receive a high-level command description and device information from the target device. The command generator is configured to produce the device-specific configuration with reference to the high-level command description, the state description, and the device information.

In another approach, a method of deploying a device-specific configuration is described. The method involves receiving a configuration model file and a command model file. The configuration model file, with reference to a configuration library, is used to generate a configuration interface. Configuration input is received from this configuration interface. The configuration input, the configuration model file, and the configuration library are used to generate a state description. Device information is obtained from a target device, and used, along with the state description, the command model file, and a command library, to generate a device-specific configuration. The device-specific configuration is then deployed to the target device

BRIEF DESCRIPTION OF THE DRAWINGS

The accompanying drawings, which are incorporated in and form a part of this specification, illustrate embodiments of the invention and, together with the description, serve to explain the principles of the invention:

FIG. 6A is an exemplary configuration model file, in accordance with one embodiment.

FIG. 6B is the continuation of the exemplary configuration model file, in accordance with one embodiment.

FIG. 8 is an exemplary state description, in accordance with one embodiment.

FIG. 9 is an exemplary command model file, in accordance with one embodiment.

DETAILED DESCRIPTION

Figure 1:
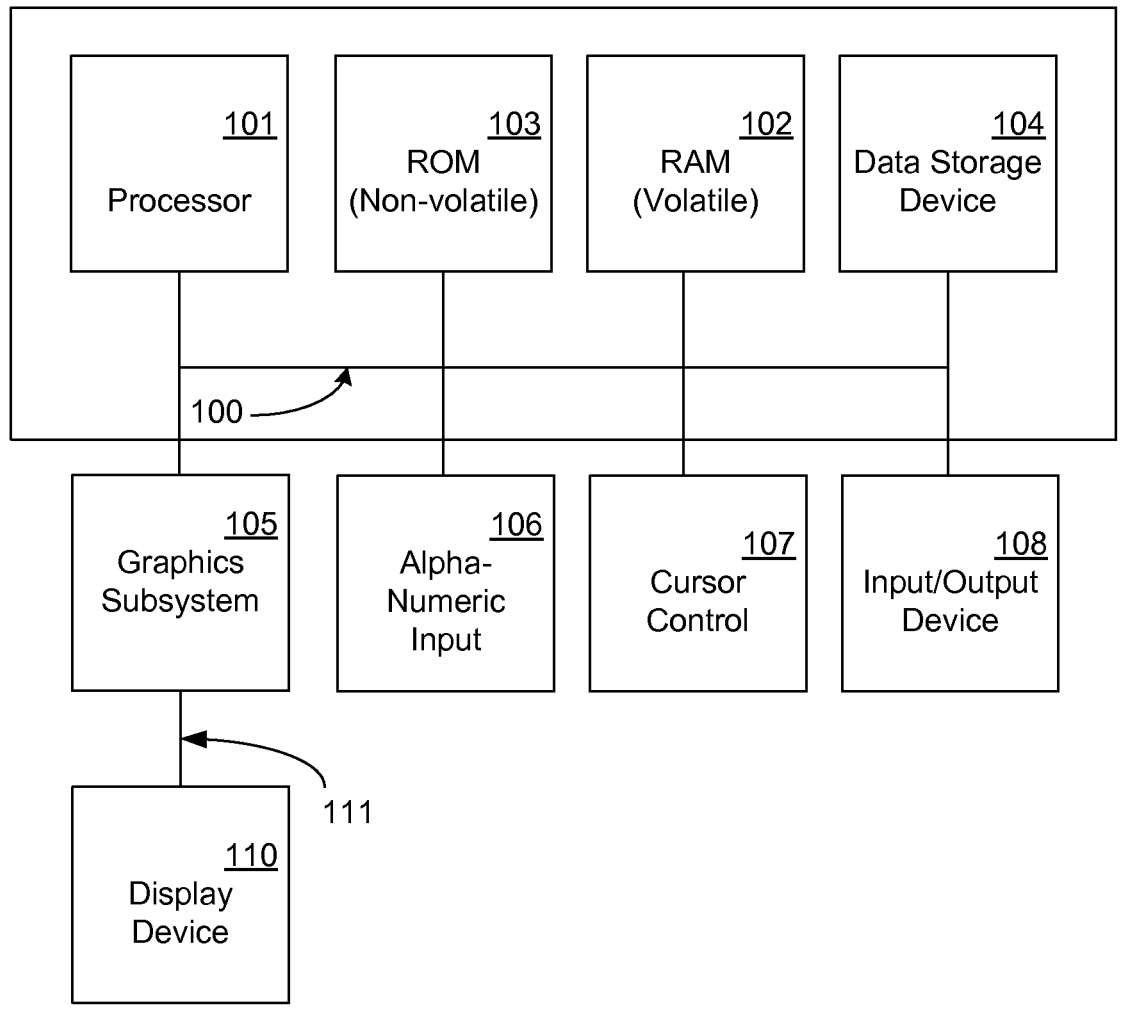
FIG. 1 is a block diagram of an exemplary computer system upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternatives, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 4) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computing devices, such as computing system 112, typically include at least some form of computer readable media. Computer readable media can be any available media that can be accessed by a computing device. By way of example, and not limitation, computer readable medium may comprise computer storage media and communication media. Computer storage media includes volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other medium which can be used to store the desired information and which can be accessed by a computing device. Communication media typically embodies computer readable instructions, data structures, program modules, or other data in a modulated data signals such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed, e.g., across multiple discrete programs or across multiple computers, as desired in various embodiments.

Basic Computing Device

Referring now to FIG. 1, a block diagram of an exemplary computer system 112 is shown. It is appreciated that computer system 112 described herein illustrates an exemplary configuration of an operational platform upon which embodiments may be implemented to advantage. Nevertheless, other computer systems with differing configurations can also be used in place of computer system 112 within the scope of the present invention. That is, computer system 112 can include elements other than those described in conjunction with FIG. 1. Moreover, embodiments may be practiced on any system which can be configured to enable it, not just computer systems like computer system 112. It is understood that embodiments can be practiced on many different types of computer system 112. Examples include, but are not limited to, desktop computers, workstations, servers, media servers, laptops, gaming consoles, digital televisions, PVRs, and personal digital assistants (PDAs), as well as other electronic devices with computing and data storage capabilities, such as wireless telephones, media center computers, digital video recorders, digital cameras, and digital audio playback or recording devices.

With reference to FIG. 1, an exemplary system for implementing embodiments includes a general purpose computing system environment, such as computing system 112. In its most basic configuration, computing system 112 typically includes at least one processing unit 101 and memory, and an address/data bus 100 (or other interface) for communicating information. Depending on the exact configuration and type of computing system environment, memory may be volatile (such as RAM 102), non-volatile (such as ROM 103, flash memory, etc.) or some combination of the two. Computer system 112 may also comprise an optional graphics subsystem 105 for presenting information to the computer user, e.g., by displaying information on an attached display device 110, connected by a video cable 111. Additionally, computing system 112 may also have additional features/functionality. For example, computing system 112 may also include additional storage (removable and/or non-removable) including, but not limited to, magnetic or optical disks or tape. Such additional storage is illustrated in FIG. 1 by data storage device 104. Computer storage media includes volatile and nonvolatile, removable and non-removable media implemented in any method or technology for storage of information such as computer readable instructions, data structures, program modules or other data. RAM 102, ROM 103, and data storage device 104 are all examples of computer storage media.

Computer system 112 also comprises an optional alphanumeric input device 106, an optional cursor control or directing device 107, e.g., a mouse, and one or more signal communication interfaces (input/output devices, e.g., a network interface card) 108. Optional alphanumeric input device 106 can communicate information and command selections to central processor 101. Optional cursor control or directing device 107 is coupled to bus 100 for communicating user input information and command selections to central processor

101. Signal communication interface (input/output device) 108, which is also coupled to bus 100, can be a serial port. Communication interface 108 may also include wireless communication mechanisms. Using communication interface 108, computer system 112 can be communicatively coupled to other computer systems over a communication network such as the Internet or an intranet (e.g., a local area network).

Managing Configurable Devices

In the following embodiments, a high-level approach to the management of configurable devices is described. In particular, in some embodiments, deployment of configurations for new or revised features to networking devices is simplified by providing a high-level generic toolset with which to build a high-level description of the desired features. In turn, this high-level description can be interpreted, and a device-specific configuration can be generated, without the need for a user to individually tailor the configuration for each device. In the following description, discussion of a "feature" is understood to include discussion of the configuration of that feature; similarly, discussion of a new feature is understood to include configuration of a new feature, as well as a new configuration of an existing feature.

In some embodiments, the combination of the configuration model and command model files allows developers of network device software to generate commands for configuring features of network devices, e.g., CLI (command line interface) parser code or data, or SNMP (Simple Network Management Protocol) MIBs (Management Information Base), for the features described in those files. These embodiments benefit in several ways: the models allow for easier development of software for network devices, and also aid in administering the network.

Exemplary Network

Figure 2:
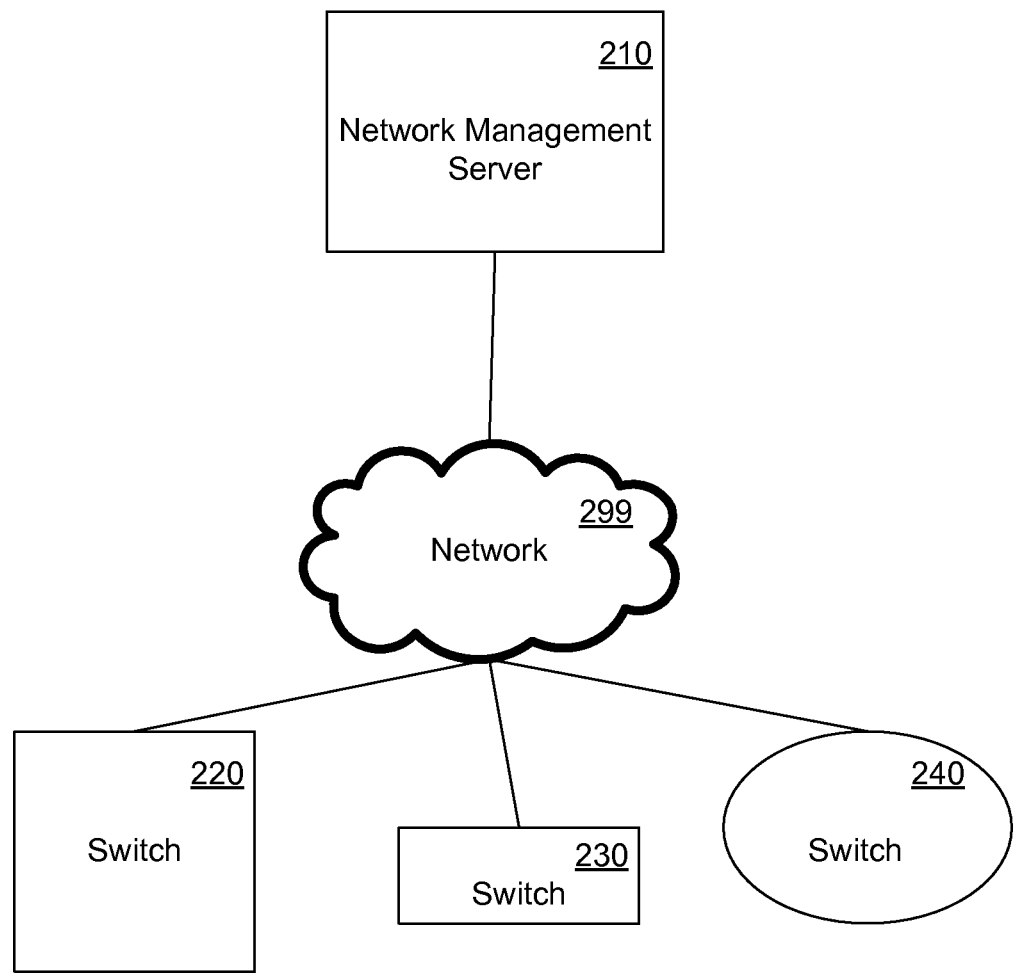
FIG. 2 is a block diagram of an exemplary network upon which embodiments of the present invention may be implemented.

With reference now to FIG. 2, an exemplary network 200 is depicted, in accordance with one embodiment. While exemplary network 200 is shown as incorporating specific enumerated elements and features, it is understood that embodiments are well suited to networks having different, fewer, or additional features, elements, or configurations. In particular, it is understood that the recited network elements may differ, across different embodiments. For example, an embodiment may be utilized in conjunction with a network which includes network switches, routers, firewalls, wireless access points, or any other network device or combination of network devices.

Exemplary network 200 is shown as including a network management server 210. Network management server 210, in the depicted embodiment, allows administration of various devices within exemplary network 200. Such administration tasks, in the depicted embodiment, may include configuring various network devices with various features. For example, in one embodiment, network management server 210 may configure a switch within exemplary network 200, to implement an access control list (ACL), which regulates network traffic that passes through the switch.

Exemplary network 200, in the depicted embodiment, is shown as including three different switches, switch 220, switch 230, and switch 240. These three switches are depicted as interconnected with network management server 210 via network 299. In the depicted embodiment, these three switches may have different versions of their operating software installed, or may be different models, or may be from different manufacturers.

Traditionally, in order for network management server 210 to implement support for configuration of the same new feature, e.g., ACLs, three different variations of the code implementing support for the new feature may need to be written, one for each of the three different switches. In some cases, while similar devices may provide similar capabilities, the code for each requires customization. For example, while all three switches may implement some version of the standard CLI (command line interface) used for configuring network devices, the specific syntax, parameter names, or command names may vary across the three different devices. This approach does not scale well, as progressively greater investments of time are required to provide support for new features across device types which vary in the commands needed to configure those features.

In some of the embodiments described below, a more scalable approach is described. For example, in one embodiment, one or more high-level descriptions are written, regardless of the number different types of devices to be configured. These high-level description files can be interpreted automatically, and device-specific configurations generated, without the user needing to individually create device configurations for every device being managed. Such high-level descriptions can be used by a network management software developer, e.g., to aid in adding or modifying support for the described features in a network device's software. Such files can also be utilized by a network administrator to streamline network administration tasks, e.g., deploying a new ACL across multiple devices.

Exemplary Networking Device

Figure 3:
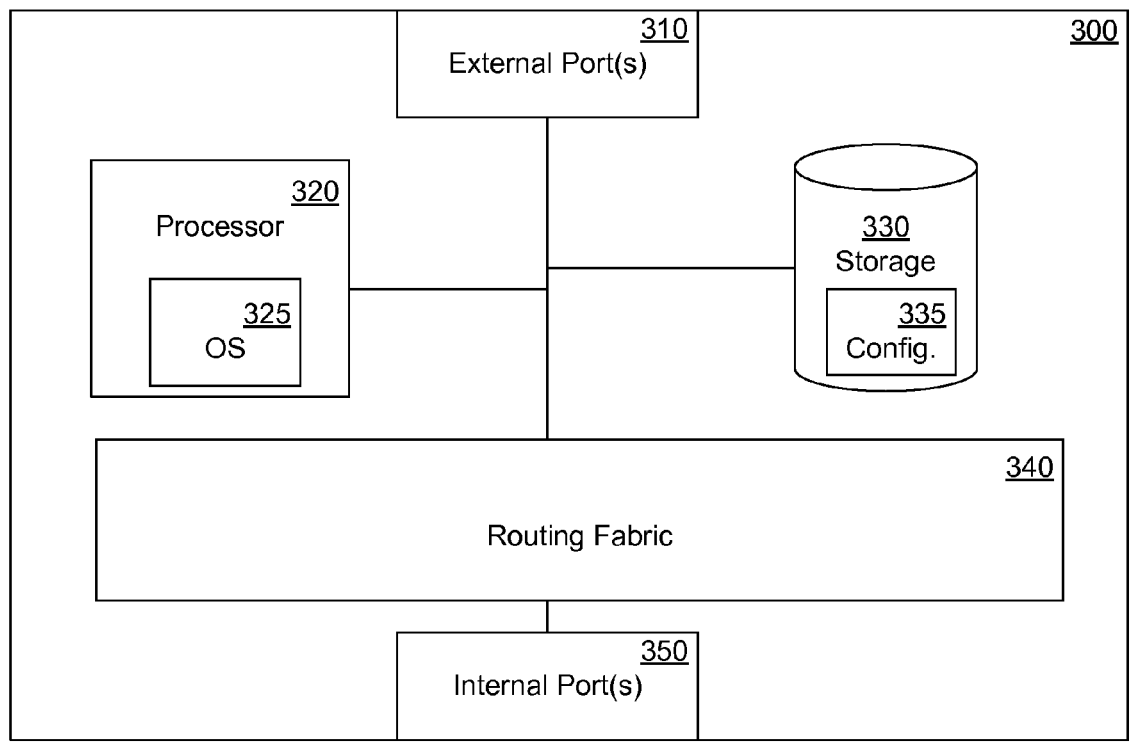
FIG. 3 is a block diagram of a network device upon which embodiments of the present invention may be implemented.

With reference now to FIG. 3, a block diagram of a network device 300 is depicted, in accordance with one embodiment. While network device 300 is shown as incorporating specific enumerated features, it is understood that embodiments are well suited to applications involving additional, fewer, or different features and elements. Further, it is understood that embodiments are not limited to applications involving network switches or routers. For example, embodiments may be implemented as a switch, a router, or a network appliance, either wired or wireless.

Network device 300 is shown as including external port(s) 310, processor 320, storage 330, routing or switching fabric 340, and internal port(s) 350. External port 310, in the depicted embodiment, allows network device 300 to be connected to other networking devices, e.g., as part of a larger network like exemplary network 200. Internal port 350 connects network device 300 with "client" devices, e.g., individual computers which access a network through network device 300, or other switches or routers which are connected to network device 300.

Processor 320 executes instructions for controlling network device 300, and for managing traffic passing through network device 300. An operating system 325 is shown as executing on processor 320; in some embodiments, operating system 325 supplies the programmatic interface to network device 300.

Network device 300 is also shown as including storage 330. In different embodiments, different types of storage may be utilized, as well as differing amounts of storage. For example, in some embodiments, storage 330 may consist of flash memory, magnetic storage media, or any other appropriate storage type, or combinations thereof. In some embodiments, storage 330 is used to store operating system 325, which is loaded into processor 320 when network device 300 is initialized. In the depicted embodiment, operating system 325 includes some or all of the software executing on the network device; in some embodiments. In other embodiments, other software may execute on the network device, e.g., to manage features of the device. Additionally, as shown, storage 330 contains configuration 335. Configuration 335 provides instructions for operating system 325 on how network device 300 is to be operated.

Network device 300 also includes routing fabric 340. In the depicted embodiment, routing fabric 340 allows network traffic to be passed between a source and a destination, by performing operations for manipulating packets and establishing connections between ports.

In order to alter the operation of network device 300, in some embodiments, operating system 325 is instructed to perform certain specified actions. These instructions may involve a change to operating system 325 itself, or to other software executing on network device 300, as in the implementation of a completely new feature for network device 300, or they may involve supplying a new or altered configuration 335 for network device 300. As noted previously, network devices from different manufacturers, or of different model types, may not use the same command syntax, e.g., CLI commands for network device 300 may not be compatible with another switch in the same network, and vice versa.

Generating Device-Specific Configurations

Figure 4:
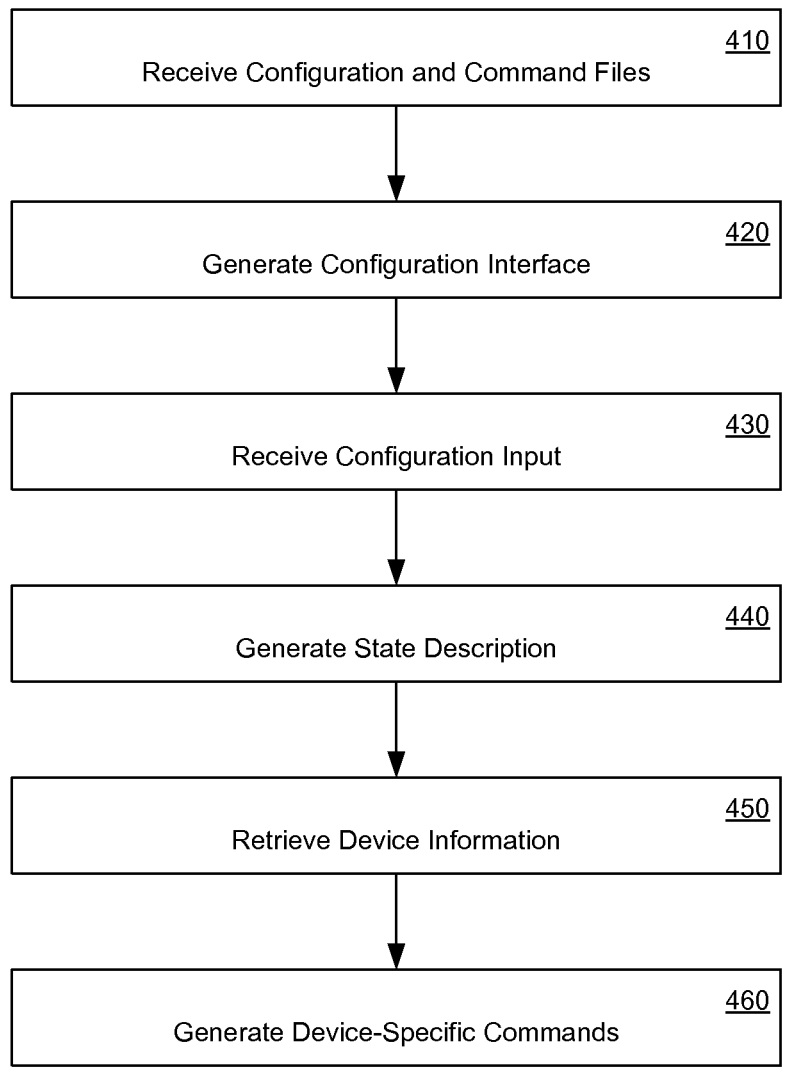
FIG. 4 is a flowchart of a method of generating device-specific configurations, in accordance with one embodiment.

With reference now to FIG. 4, a flowchart 400 of a method of generating device-specific configurations is depicted, in accordance with one embodiment. Although specific steps are disclosed in flowchart 400, such steps are exemplary. That is, embodiments of the present invention are well suited to performing various other (additional) steps or variations of the steps recited in flowchart 400. It is appreciated that the steps in flowchart 400 may be performed in an order different than presented, and that not all of the steps in flowchart 400 may be performed.

With reference to step 410, a configuration model file and a command model file are received. In some embodiments, these two files are user generated or created, and provided to a network management system, e.g., running on a network management server such as network management server 210. As explained in greater detail below, in this embodiment the configuration model file and the command model file are used to specify a new feature configuration or functionality, or revisions to an existing feature configuration or functionality. However, it is understood that in other embodiments, other tasks may be performed. For example, in one embodiment, these files may describe existing functionality on the device for which network management support is currently unavailable in the target network management system.

While the described embodiment specifies a separate configuration model file and a separate command model file, it is understood that embodiments are well suited to applications involving different arrangements. In some embodiments, the distinction between the configuration model file and the command model file is a functional distinction, rather than a format requirement. For example, a single file may contain information functionally equivalent to the configuration model file and the command model file. Similarly, in some embodiments, the functional equivalent of the configuration model file and/or the command model file may span numerous separate files. In different embodiments, different numbers and/or arrangements of information may be utilized.

With reference to step 420, a configuration interface is generated from a configuration model file, with reference to a configuration library. In some embodiments, a configuration model file is written using generic "building blocks." These building blocks are defined in the configuration library. As is explained in greater detail, below, in some embodiments the configuration model file specifies various generic user interface elements, with which to construct the configuration interface. In some embodiments, the configuration model file also specifies the interrelationships between the various elements, and the constraints, if any, on these elements, in the new or revised feature configuration.

With reference to step 430, a configuration input is received through the configuration interface. In some embodiments, the configuration interface is implemented as a graphical user interface (GUI). In one such embodiment, a user can use the GUI to specify specific parameters for a configuration of a feature, e.g., to select between "permit" or "deny" actions, or to specify a range of IP addresses, when configuring an ACL. Also, in some embodiments, the user can use the GUI to create multiple instantiations of an element in a feature, e.g., creating multiple entries in an ACL, and configuring each of them. In other embodiments, other configuration interfaces are utilized, e.g., a programmatic interface to allow another program to manage the network management system, or to provide a scripting interface to allow small programs to create or modify configurations of device features and deploy them to one or more devices.

With reference to step 440, a state description is generated, with reference to the configuration input, the configuration model file, and the configuration library. In some embodiments, the state description is generated by interpreting the configuration model file, in light of the configuration input. The configuration model file, in one such embodiment, provides information as to which elements are to be included, and the interrelationships between those elements. The configuration input, in this embodiment, provides specific details, e.g., specific parameter values, which (optional) parameters to include, and how many instantiations of each element should be included in the feature. In some embodiments, the configuration library provides the necessary generic tools or building blocks to allow the configuration model file to be relatively short.

With reference now to step 450, device information is retrieved from a device in the network. Device information, for example, may be a brand or manufacturer identification number, a model number, the version of the operating software for the device, the current configuration or state of the device, or combinations of the above. In several embodiments, device information is used to determine which features may be implemented on a particular device, and the specific syntax of the commands used to configure the feature. In some embodiments, device information may be retrieved by a network management server, e.g., network management server 210, by issuing a request to an attached or accessible device, e.g., switch 220.

With reference now to step 460, device-specific commands are generated, with reference to the command model file, the command library, the configuration model file, the configuration library, and the state description. The command model file provides a high-level template for each command necessary to configure the feature. In several embodiments, these templates are constructed from generic (high-level) command "building blocks." These building blocks are defined by the command library.

Moreover, in some embodiments, the command model file specifies which device types/models and/or device software versions may implement the feature, and provides the necessary device-specific parameters. The command model file further provides alternative templates, where the structure or syntax of the commands for the feature will vary across different devices. The command library is used to interpret or translate the command building blocks used by the command templates defined by the command model file, in order to implement the described instructions. In some embodiments, the command library and/or the configuration library may be incorporated into the related model file; e.g., the command model file includes the necessary low-level configuration commands, or the configuration library includes the necessary user interface elements.

In the depicted embodiment, the command model file provides the necessary templates to construct the commands to configure the features, while the command library interprets the high-level building blocks used to construct these templates. The state description, in turn, provides specific parameters and their values for these commands. In this embodiment, the configuration model file, with reference to the configuration library, provides interrelationships, e.g., dependencies or constraints, between various parameters, elements, or commands. From the combination of these elements, a device-specific configuration of the feature can be generated.

Moreover, different device-specific configurations can be generated across a wide range of devices, without the need for additional input. The high-level descriptions provided in the configuration model file and the command model file, in conjunction with the generated state description, are sufficient to generate different device-specific configurations for different devices, provided that the command model file specifies any necessary variations in the templates for the commands needed for configuring the feature on the various devices.

System for Generating Device-Specific Configurations

Figure 5:
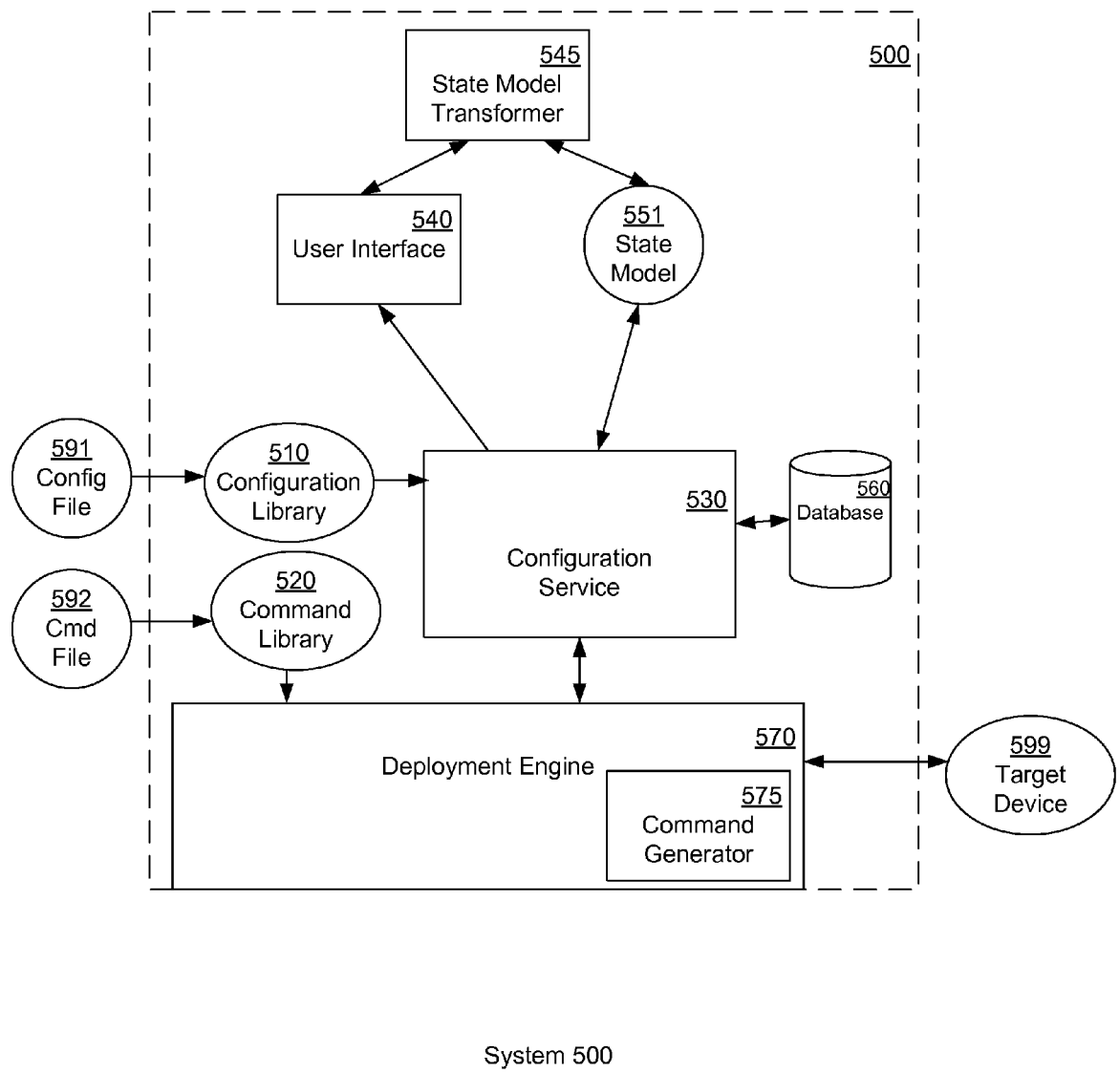
FIG. 5 is a block diagram of a system for generating device-specific configurations, in accordance with one embodiment.

With reference now to FIG. 5, a block diagram of a system 500 is depicted, in accordance with one embodiment. While system 500 is shown as incorporating specific enumerated features and elements, it is understood that embodiments are well suited to applications involving additional, fewer, or different features, elements, or arrangements.

In the depicted embodiment, system 500 is used to generate device-specific configurations, e.g., to generate low-level commands for the configuration of features from high-level descriptions of those configurations. As shown, two functionally distinct input files, configuration model file 591 and command model file 592, are provided to system 500. From these high-level descriptions, system 500 generates low-level configuration instructions for configuring a target device 599, which is managed by system 500.

System 500 is shown as including a configuration library 510, and a command library 520. These two libraries are used by system 500 to interpret configuration model file 591 and command model file 592. These libraries allow the two user-provided files to specify a new or revised feature, in terms of generic building blocks, which will be understood by the system. Moreover, these libraries allow for easier extension of system 500 to support new configuration elements, and additional target devices.

System 500 is also shown as including configuration service 530, user interface 540, state model transformer 545, state model 551 (an in-memory model of a state description), database 560, and deployment engine 570, which includes command generator 575.

Configuration service 530 generates user interface 540, in the depicted embodiment, by interpreting a configuration model file 591, with reference to configuration library 510. In this embodiment, user interface 540 allows a user to provide specific parameters for various feature elements, manipulate the relationships between parameters or elements, or include additional instantiations of various elements for the feature. In some embodiments, this user interface is implemented as a graphical user interface, e.g., accessible via a Web browser. In other embodiments, different forms of interface may be utilized. For example, in one embodiment, no user input is accepted; instead, in this embodiment, another program may pregenerate a state model 551.

In some embodiments, a user may wish to further modify the user interface generated by the configuration service, e.g., to alter the look and feel of the interface, or to provide additional functionality. In one such embodiment, the user may also provide a user interface model file (not shown). Configuration service 530 generates a user interface 540 with reference both to configuration model file 591 and to this custom user interface model file.

State model transformer 545 accepts parameter information and other configuration input from the user interface 540. In conjunction with configuration model file 591, as interpreted by configuration library 510, state model transformer 545 generates state model 551.

Configuration service 530, in this embodiment, receives a state model 551 from state model transformer 545. State model 551 can then be stored in database 560, until it is time to deploy the new or revised feature to a target device 599. Also, in some embodiments, user interface 540 can be utilized to make changes to state model 551 before deployment; state model transformer 545 generates a revised state model 551.

When a new feature is deployed by system 500, the state model is passed to deployment engine 570. Deployment engine 570, in some embodiments, retrieves device information from target device 599; in other embodiments, device information may be available from another source, e.g., from a database of stored device information. Device information, in some embodiments, identifies the model or version of target device 599, or the current state of target device 599. Deployment engine 570, in several such embodiments, can utilize this device information to determine whether a particular feature can be deployed to that target device, e.g., by checking command model file 592 for a list of supported target device types and/or software versions for that feature. Moreover, in some embodiments, device information is used to determine what action to take, e.g., whether to create as new, add, delete, or update each feature element within each device's existing configuration.

Deployment engine 570 uses the state model 551 and command model file 592, as interpreted by command library 520, to generate specific low-level commands for target device 599, in order to configure the desired feature. In some embodiments, command model file 592 provides templates for the commands necessary to implement the desired feature. In several such embodiments, these commands are expressed in terms of high-level building blocks, which are defined by and interpreted in light of command library 520. Moreover, in some embodiments, several different device-specific templates may be provided by command model file 592, e.g., to allow for variations in commands needed for different device types and/or device software versions.

In these embodiments, command generator 575 constructs low-level commands for target device 599 by combining the specific parameters provided by state model 551 with the templates defined by command model file 592. Command model file 592 also provides the low-level definitions specific to target device 599, which are used to in combination with the command "building blocks" provided by command library 520 to implement the high-level commands defined by command model file 592.

In some embodiments, deployment engine 570 also transmits a device-specific configuration to target device 599. In different embodiments, different approaches are utilized to facilitate this deployment. For example, in one embodiment, the deployment engine 570 produces SNMP (simple network management protocol) packets, which can remotely configure target device 599 with the new feature.

In some embodiments, system 500 can also be used to modify the existing state of target device 599. For example, deployment engine 570 retrieves the current state of target device 599, as well as any device information. Deployment engine 570, in this embodiment, uses the current state of target device 599 to build state model 561. Modifications to state model 561 can then be made by state model transformer 545, in accordance with configuration model file 591 and/or command model file 592. This embodiment allows, for example, for minor modifications to be made to target device 599, without needing to rebuild the entire configuration for the target device.

In some embodiments, the command model file and configuration model file could also be used by a developer of network device software to generate the CLI parser code or data and/or SNMP MIBs for the features described in those files. This would make the model files dual-purpose—they could be used to help generate the software on the devices, and could be used by a network management system to manage those devices.

Extensions and New Device Types or Software Versions

Adding support for additional device types or device software versions, in the above-described embodiments, is a straightforward process. In order to generate device-specific commands for a new device, command model file 592 is updated to provide the specific commands needed to configure the new device. Alternatively, in some embodiments, the new device may share some or all of the characteristics and commands of an already-included device. In such a scenario, command model file 592 is updated to indicate which existing commands are appropriate for the new device. In order to indicate support for a feature on a new type of device, the corresponding command model file is updated to indicate that the feature is supported by devices of that type.

XML and Linking

In some embodiments, the configuration model file, command model file, configuration library, and command library are implemented using the extensible markup language (XML). In these embodiments, XML offers a convenient, textual approach to describing the elements and parameters that are used to create new features, and an XML schema grammar allows for complex relationships and constraints to be expressed. In one embodiment, one or more XML languages or schemas are utilized to implement the command library and the configuration library. Moreover, XML offers an integrated approach to linking between documents, which some embodiments make use of.

In other embodiments, XML is not used, and other approaches are utilized.

In some embodiments, links are utilized to interrelate elements. These elements may be present within the same file, or distributed across multiple files. For example, linking is utilized to correlate commands, e.g., from a command library, with specific parameters, e.g., from a state description. Linking offers several advantages: it allows the above-described linking between generic commands and specific parameter locations, which is used when generating device-specific configurations; it can be used to establish relationships between features, as well as to define constraints on these relationships; and it can be used to establish a dependency between one portion of a feature and other portions of that feature, which aids in automating the validation of configuration input.

In one embodiment, where XML is utilized, linking is conveniently implemented using the XPath query language. In another embodiment, a simpler structure is utilized, which is, in turn, mapped to XPath. The XPath query language is available in XML to traverse multiple documents and express conditions. In other embodiments, other approaches to linking are utilized.

Exemplary Configuration Model File

With reference now to FIGS. 6A and 6B, an exemplary configuration model file 600 is depicted, in accordance with one embodiment. Exemplary configuration model file 600 is an XML file for use in generating a layer 2 access control list (ACL).

Portions of exemplary configuration model file 600 are utilized by a configuration service, e.g., configuration service 530, to generate a user interface, e.g., user interface 540, by referencing a configuration library, e.g., configuration library 510. At line 601, configuration model file 600 defines a feature, L2AclConfiguration, and specifies that this feature relies upon a configuration library, configLibrary.xsd. At lines at 602 and 604, configuration model file 600 specifies two types of operation, add and delete, which should be available through the resulting interface.

At line 606, configuration model file 600 specifies that a new instance of a configuration element, named L2AclConfiguration, is to be created. At line 608, a new instance of a configuration element, named Acl is created within L2AclConfiguration. At line 610, a field is defined, named AclNumber, within configurationAcl Line 615 creates another new configuration element, named Entries, within the configuration element named Acl Entries, in turn, contains a number of different fields: Action, defined at line 620; SrcMacAddress, defined at line 621; SrcAddressMask, defined at line 622; DestMacAddress, defined at line 623; DestAddressMask, defined at line 624; VLAN, defined at line 625; EtherType, defined at line 626; and Logging, defined at line 627.

Given configuration model file 600, a configuration service can generate a user interface which allows a user to specify the parameters needed to create a level 2 ACL. The syntax used in configuration model file 600 is defined by a configuration library, which allows configuration model file 600 to make use of predefined elements, when specifying how the user interface is to operate.

Exemplary User Interface

Figure 7:
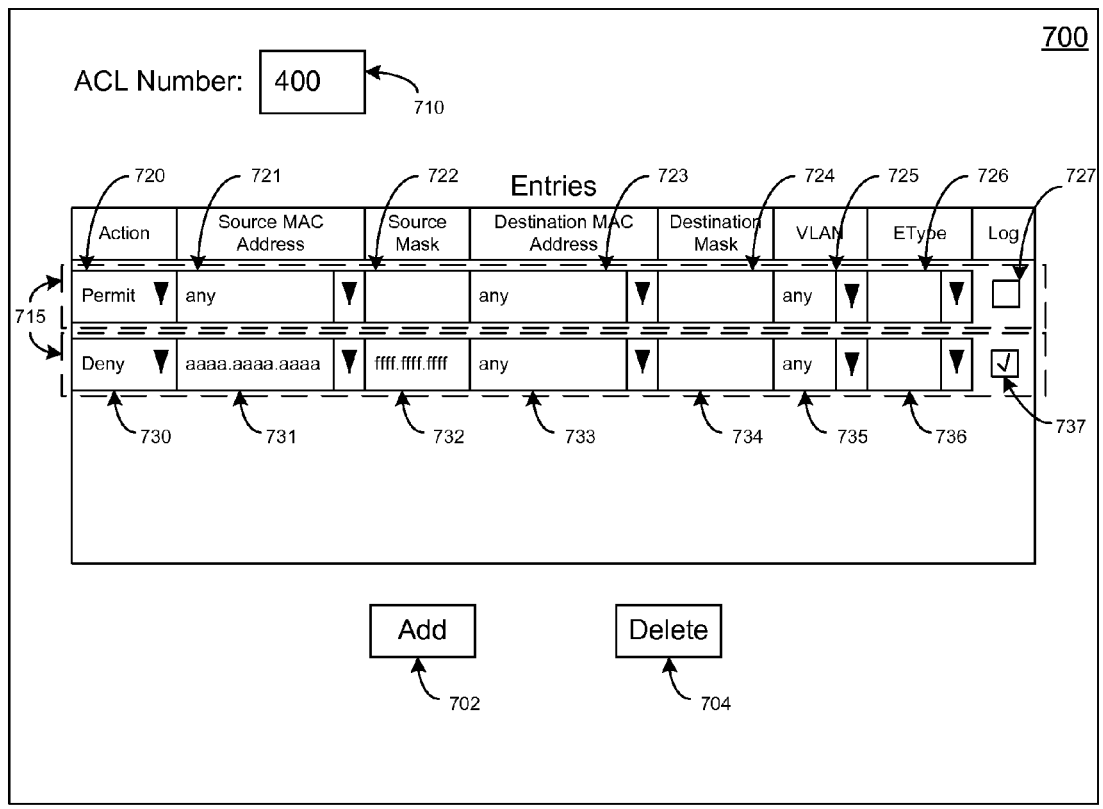
FIG. 7 is a depiction of an exemplary user interface, in accordance with one embodiment.

With reference now to FIG. 7, a depiction of an exemplary user interface 700 is provided, in accordance with one embodiment. While exemplary user interface 700 is shown as incorporating specific enumerated features, it is understood that embodiments are well suited to applications involving additional, fewer, or different features, elements, or arrangements.

As shown, user interface 700 is an implementation of a user interface derived from configuration model file 600, e.g., user interface 700 allows a user to specify the parameters and options needed for a level 2 ACL. User interface 700 includes add button 702 and delete button 704, corresponding to lines 602 and 604 of configuration model file 600. User interface 700 allows a user to specify ACL number 710, which corresponds to line 610 of configuration model file 600. The user interface 700 also allows the user to make one or more entries 715 in the access control list, per line 615. One such entry includes action field 720, source MAC address field 721, source mask field 722, destination MAC address field 723, destination mask field 724, VLAN field 725, EType field 726, and log field 727. Similarly, another entry includes action field 730, source MAC address field 731, source mask field 732, destination MAC address field 733, destination mask field 734, VLAN field 735, EType field 736, and log field 737. The fields in each entry 715 correspond to the fields defined in configuration model file 600 at lines 620 through 627.

Using user interface 700, a user may define a level 2 access control list having as many entries as desired, and modify the parameters within those entries.

Exemplary State Description

With reference now to FIG. 8, an exemplary state description 800 is depicted, in accordance with one embodiment. State description 800, in the depicted embodiment, is an XML file generated by a state model transformer, e.g., state model transformer 545, from a configuration model file and user provided input.

As shown, state description 800 includes section 801, which corresponds to lines 606, 608, and 610 of configuration model file 600, and includes ACL number 710, provided by the user via user interface 700. State description 800 also includes sections 802 and 803, which are instantiations of the "Entries" configuration element defined in configuration model file 600 at line 615. Each instantiation corresponds to one entry 715 provided by a user through user interface 700. For example, element 820 in state description 800 combines line 620 of configuration model file 600 with field 720 provided by user interface 700. Similarly, element 821 is a combination of line 621 and field 721; element 822 is a combination of line 622 and field 722; element 823 is a combination of line 623 and field 723; element 824 is a combination of line 624 and field 724; element 825 is a combination of line 625 and field 725; element 826 is a combination of line 626 and field 726; and element 827 is a combination of line 627 and field 727.

A state description, such as state description 800, is used by a deployment engine, such as deployment engine 570, to generate commands for configuring a target device. The state description is combined with a command model file, with reference to a command library, to generate commands which will be applied to the target device.

Moreover, the state description can be stored, to allow a user to modify a feature's configuration at a later time. For example, user interface 700 may be regenerated from configuration model file 600 at a later time, and the data provided in state description 800 can be parsed and used to re-create the entries. In this way, the state description speeds modification and deployment of existing features.

Exemplary Command Model File

With reference now to FIG. 9, an exemplary command model file 900 is depicted, in accordance with one embodiment. Command model file 900, as shown, is an XML file which defines a desired feature, e.g., layer 2 ACL. In the depicted embodiment, command model file 900 is used to construct device-appropriate CLI commands by collecting various parameters provided by a state description and using syntax appropriate to the target device.

Command model file 900 makes use of linking to access parameters in state description 800. A data structure is created in memory, corresponding to state description 800. To generate commands, links into this data structure are used to pull out specific configuration parameters. This data structure allows for efficient access to configuration parameters stored therein.

Command model file 900, as shown, includes line 915, which defines a command named "L2Acl". This command is linked to the indicated structure, which corresponds to one L2Acl command per entry created through user interface 700.

Command model file 900 also includes section 916. In different embodiments, different features may not be available across all target devices. In the depicted embodiment, those target device types and associated software versions which support the layer 2 ACL feature are specified in this section. If a deployment engine, e.g., deployment engine 570, determines that a target device is not one of these enumerated device types and associated software versions, it will not attempt to deploy this feature to that target device.

Command model file 900 includes a section 910, which is linked to a provided ACL number. Command model file 900 also includes section 920, which is linked to the action indicated by the user; depending upon the action selected, a different CLI command or keyword is utilized. Command model file 900 includes section 921, which is linked to a source MAC address; section 922, linked to a source address mask; section 923, linked to a destination MAC address; section 924, linked to a destination address mask; section 925, linked to a VLAN ID or number; section 926, linked to the EtherType; and section 927, linked to the logging parameter.

In the depicted embodiment, section 927 includes a number of device-specific CLI options. Depending on the type of target device, one of several syntax options may be appropriate. For example, if logging is enabled, and the target device is of type MG8, the appropriate CLI text is "log-enable." If logging is enabled, but the target device is instead an XMR device, the appropriate CLI text is "log."

Embodiments of the present invention are thus described. While the present invention has been described in particular embodiments, it should be appreciated that the present invention should not be construed as limited by such embodiments, but rather construed according to the following claims.

What is claimed is:

1. A method of generating a device-specific configuration for a network device, comprising:
   accepting an updated configuration parameter that updates a feature of a device via a template that is used to construct commands that are provided by a command model file and used for device specific configuration, wherein alternative templates are provided for said commands to accommodate variations in structure and/or syntax of said commands for the same feature across a plurality of different devices;
   accepting command syntax information that is applicable to a plurality of devices wherein said command syntax information comprises a set of high level features that are applicable to the plurality of devices;
   generating a state description that is applicable to a plurality of devices from said updated configuration parameter, with reference to a configuration library wherein said state description comprises a set of high level features that are applicable to a plurality of different devices;
   storing said state description in a database;
   retrieving device information from said network device;
   generating said device-specific configuration for said network device with reference to said command syntax information, said device information, said state description, and a command library;
   transmitting graphical user interface information according to the plurality of devices and generating a configuration interface with reference to a configuration model file and said configuration library;
   accepting said updated configuration parameter through said configuration interface;
   receiving a command model file; and
   generating a device specific configuration based on said configuration model file and said command model file.

2. The method of claim 1, wherein said accepting said updated configuration parameter comprises receiving said configuration model file.

3. The method of claim 2, wherein said accepting said updated configuration parameter further comprises:
generating a configuration interface with reference to said configuration model file and said configuration library; and
accepting said updated configuration parameter through said configuration interface.

4. The method of claim 3, wherein said generating said configuration interface further comprises generating said configuration interface with reference to a custom user interface model file.

5. The method of claim 2, wherein said configuration model file is written in accordance with an extensible markup language (XML) schema.

6. The method of claim 1, wherein said receiving command syntax information comprises receiving said command model file.

7. The method of claim 6, wherein said command model file provides a template for a desired feature, said template comprising a plurality of high-level instruction blocks.

8. The method of claim 7, wherein said generating said device-specific configuration comprises:
for each of said plurality of high-level instruction blocks, obtaining a corresponding instruction from said command library; and
constructing a low-level command from said instructions and said updated configuration parameter.

9. The method of claim 8, wherein said low-level command comprises a command line interface (CLI) command.

10. The method of claim 8, wherein said low-level command comprises a Simple Network Management Protocol (SNMP) packet.

11. The method of claim 6, wherein said command model file is written in accordance with an extensible markup language (XML) schema.

12. The method of claim 1, wherein said generating said state description comprises writing said updated configuration parameter to a state description file.

13. The method of claim 12, wherein said state description file is written in accordance with an extensible markup language (XML) schema.

14. A system for generating a device-specific configuration, comprising:
a computer implemented component for providing a configuration service, for obtaining and processing configuration information;
a state model transformer, for producing a state description that is applicable to a plurality of devices; and
a command generator, for generating said device-specific configuration for a network device, wherein said configuration service is configured to receive said configuration information, said state model transformer is configured to produce said state description from said configuration information and a configuration parameter that updates a feature of a device via a template that is used to construct commands that are provided by a command model file and used for device-specific configuration, wherein alternative templates are provided for said commands to accommodate variations in structure and/or syntax of said commands for the same feature across a plurality of different devices, said command generator is configured to receive a high-level command description that is applicable to a plurality of devices, said command generator is further configured to receive device information from a network device, and said command generator is configured to produce said device-specific configuration for said network device based on said high-level command description that is applicable to a plurality of devices, said state description from a configuration model file and a configuration library, and said device information,
wherein information is transmitted to said network device.

15. The system of claim 14, further comprising:
a deployment engine,
wherein said deployment engine is configured to transmit said device-specific configuration to said target device.

16. The system of claim 14, further comprising:
said configuration library, for use by said configuration service in processing said configuration information.

17. The system of claim 14, further comprising:
a command library, for use by said command generator in producing said device-specific configuration with reference to said high-level command description.

18. The system of claim 14, wherein said system is part of a network management system.

19. A method of deploying a device-specific configuration, comprising:
receiving a configuration model file and a command model file that includes information that is applicable to a plurality of devices;
generating a configuration interface with reference to said configuration model file and a configuration library;
receiving a configuration input through said configuration interface that updates an existing feature of a device via a template that is used to construct commands that are provided by said command model file and used for device-specific configuration, wherein alternative templates are provided for said commands to accommodate variations in structure and/or syntax of said commands for the same feature across a plurality of different devices;
generating a state description that is applicable to a plurality of devices from said configuration input, said configuration model file, and said configuration library;
retrieving device information from a target device;
generating said device-specific configuration for said target device with reference to said command model file, a command library, said state description from said configuration model file and said configuration library, and said device information; and
deploying said device-specific configuration for said target device to said target device.

* * * * *